(12) United States Patent
Ly

(10) Patent No.: US 7,121,315 B2
(45) Date of Patent: Oct. 17, 2006

(54) AUTOMOBILE SUNSHADE

(76) Inventor: Douglas Ly, 898 Feather Peek Rd., Corona, CA (US) 92882

(*) Notice: Subject to any disclaimer, the term of this patent is extended or adjusted under 35 U.S.C. 154(b) by 0 days.

(21) Appl. No.: 10/824,532

(22) Filed: Apr. 14, 2004

(65) Prior Publication Data

US 2005/0230059 A1 Oct. 20, 2005

(51) Int. Cl.
*B60J 1/00* (2006.01)

(52) U.S. Cl. .................... 160/105; 160/370.21

(58) Field of Classification Search ........... 160/370.21, 160/105, 370.22, 370.23, DIG. 2; 296/97.7, 296/97.8

See application file for complete search history.

(56) References Cited

U.S. PATENT DOCUMENTS

| | | | | |
|---|---|---|---|---|
| 2,598,770 A | * | 6/1952 | Drozt | 160/105 |
| 2,643,711 A | * | 6/1953 | Smith | 160/105 |
| 4,285,383 A | * | 8/1981 | Steenburgh | 160/374 |
| 5,024,262 A | * | 6/1991 | Huang | 160/370.21 |
| 5,035,460 A | * | 7/1991 | Huang | 296/95.1 |
| 5,553,908 A | * | 9/1996 | Shink | 296/97.8 |
| 5,687,786 A | * | 11/1997 | Tsai | 160/370.21 |
| 5,845,697 A | * | 12/1998 | Zheng | 160/370.21 |
| 6,135,191 A | * | 10/2000 | Mitchell et al. | 160/370.21 |

* cited by examiner

*Primary Examiner*—David Purol
(74) *Attorney, Agent, or Firm*—Raymond Y. Chan; David and Raymond Patent Firm

(57) ABSTRACT

A sunshade includes a fabric shelter, which is sized and shaped adapted for sheltering a window of a window frame of a vehicle, having a heat blocking side for blocking heat radiation of sunlight from entering into the vehicle through the window frame, and a retention frame having at least two resilient retention portions spacedly mounted along a peripheral edge of the fabric shelter, wherein the resilient retention portions of the retention frame is adapted to be deformed for respectively applying an urging force against corners of the window frame of the vehicle so as to substantially support the fabric shelter within the window frame while the window thereof is allowed to be normally operated.

18 Claims, 7 Drawing Sheets

AUTOMOBILE SUNSHADE

BACKGROUND OF THE PRESENT INVENTION

1. Field of Invention

The present invention relates to a window shading device, and more particularly to an automobile sunshade which is adapted for detachably mounting on a window frame of the vehicle without interrupting the operation of the window.

2. Description of Related Arts

Driving in the summer time is a nuisance since the driver directly exposes under the sunlight. Therefore, most of the drivers must turn on the air conditioning in order to set an acceptable climate condition within the interior of the vehicle. However, air conditioning is not cost effective and energy efficient to cool down the interior temperature of the vehicle. Moreover, once the air conditioning is off, the hot air is trapped inside the vehicle. Especially when the driver at the time gets in the vehicle, the driver can feel the heat flowing in front of his or her face. In other words, when the driver gets in the vehicle, he or she feels like putting himself or herself in the oven.

In order to prevent the heat entering into the vehicle, the driver can tint the vehicle window to block the sunlight directly entering into the vehicle so as to prevent the interior temperature of the vehicle from rising by the heat of the sunlight. However, the tinted window of the vehicle is not allowed in some countries due to the safety purpose.

Alternatively, the driver is able to purchase a reflecting panel mounted on the windshield to block the sunlight entering into the interior of the vehicle in such a manner that before the driver leaves the vehicle, the driver can simply place the reflecting panel at an inner side of the windshield. It is a hassle for the driver to put on and take off each reflecting panel every time when the driver leaves and get in the vehicle respectively since a number of reflecting panels must be used to totally shelter all the vehicle windows.

Moreover, the size of each reflecting panel is relatively big for the user to carry and store. Even though the reflecting panel can be overlappedly folded into a compact size, it is annoying for the driver to fold up the reflecting panel into the compact form. In addition, the reflecting panel cannot be used during diving such that it is unreasonable to only block up the sunlight while the driver is not in the vehicle.

Another common sun shelter is used for detachably attaching on the side window of the vehicle to block the heat entering into the vehicle during driving. Accordingly, the sun shelter generally incorporates with a glass suction detachably sucking on the side window such that the driver is able to mount the sun shelter on the corresponding side window to block the sunlight. However, such sun shelter has several drawbacks.

The sucking effect of the sun shelter is weak that the sun shelter is easy to fall off from the side window. Therefore, the driver may merely re-mount the sun shelter on the side window during driving. Thus, when the sun shelter is mounted on the side window in position, the side window cannot be operated. It is because the operation of the side window will cause the sun shelter to be drop off from the side window. In other words, the driver can only select either to open the side window for allowing fresh air entering into the vehicle or to mount the sun shelter on the side window for blocking the sunlight entering into the vehicle. Furthermore, the sun shelter is shaped and sized for fitting a particular size and shape of the side window. Therefore, a smaller size of the sun shelter cannot effectively block the sunlight when it is used for a vehicle having a larger side window. Likewise, a bigger size of the sun shelter cannot be mounted on a smaller side window.

SUMMARY OF THE PRESENT INVENTION

A main object of the present invention is to provide a sunshade which is adapted for detachably mounting on a window frame of the vehicle by means of resilient arrangement without interrupting the operation of the window of the vehicle.

Another object of the present invention is to provide a sunshade, which comprises a retention frame having a plurality of resilient retention portion adapted to be deformed for fittingly retaining at corners of the window frame so as to securely mount the sunshade within the window frame of the vehicle.

Another object of the present invention is to provide a sunshade, wherein when the sunshade is mounted within the window frame during driving, the driver is able to operate the side window. In other words, the driver is able to select to open the side window for allowing fresh air entering into the vehicle and to mount the sunshade on the side window for blocking the sunlight entering into the vehicle at the same time.

Another object of the present invention is to provide a sunshade, which is adapted to detachably mount to the side window, the front window, or the rear window of the window frame of the vehicle so as to block the heat from entering into the vehicle.

Another object of the present invention is to provide a sunshade, wherein the retention frame can be deformed to adjust the size and shape of the sunshade for fitting the window frame such that the sunshade is considered as a universal sun shading device for all kinds of vehicle window.

Another object of the present invention is to provide a sunshade, which can be quickly and easily unfolded for sheltering the vehicle window for preventing heat from entering into the vehicle and folded into a compact unit for carriage and storage.

Another object of the present invention is to provide a sunshade, wherein the mounting operation of the sunshade is easy and fast by simply deforming the resilient retention portions of the retention frame for fitting at corners of the window frame.

Another object of the present invention is to provide a sunshade, wherein no expensive or complicated structure is required to employ in the present invention in order to achieve the above mentioned objects. Therefore, the present invention successfully provides an economic and efficient solution not only for blocking the sunlight from entering into the vehicle but also for normally operating the side window of the vehicle so as to facilitate the practical use of the present invention.

Accordingly, in order to accomplish the above objects, the present invention provides a sunshade for detachably mounting within a window frame of a vehicle, comprising:

a fabric shelter, which is sized and shaped adapted for sheltering a window of the window frame, having a heat blocking side for blocking heat radiation of sunlight from entering into the vehicle through the window frame, and a retention frame having at least two resilient retention portions spacedly mounted along a peripheral edge of the fabric shelter, wherein the resilient retention portions of the retention frame is adapted to be deformed for respectively applying an urging force against corners of the window frame of the vehicle so as to substantially support the fabric shelter within the window frame while the window thereof is allowed to be normally operated.

These and other objectives, features, and advantages of the present invention will become apparent from the following detailed description, the accompanying drawings, and the appended claims.

DETAILED DESCRIPTION OF THE PREFERRED EMBODIMENT

Figure 1:
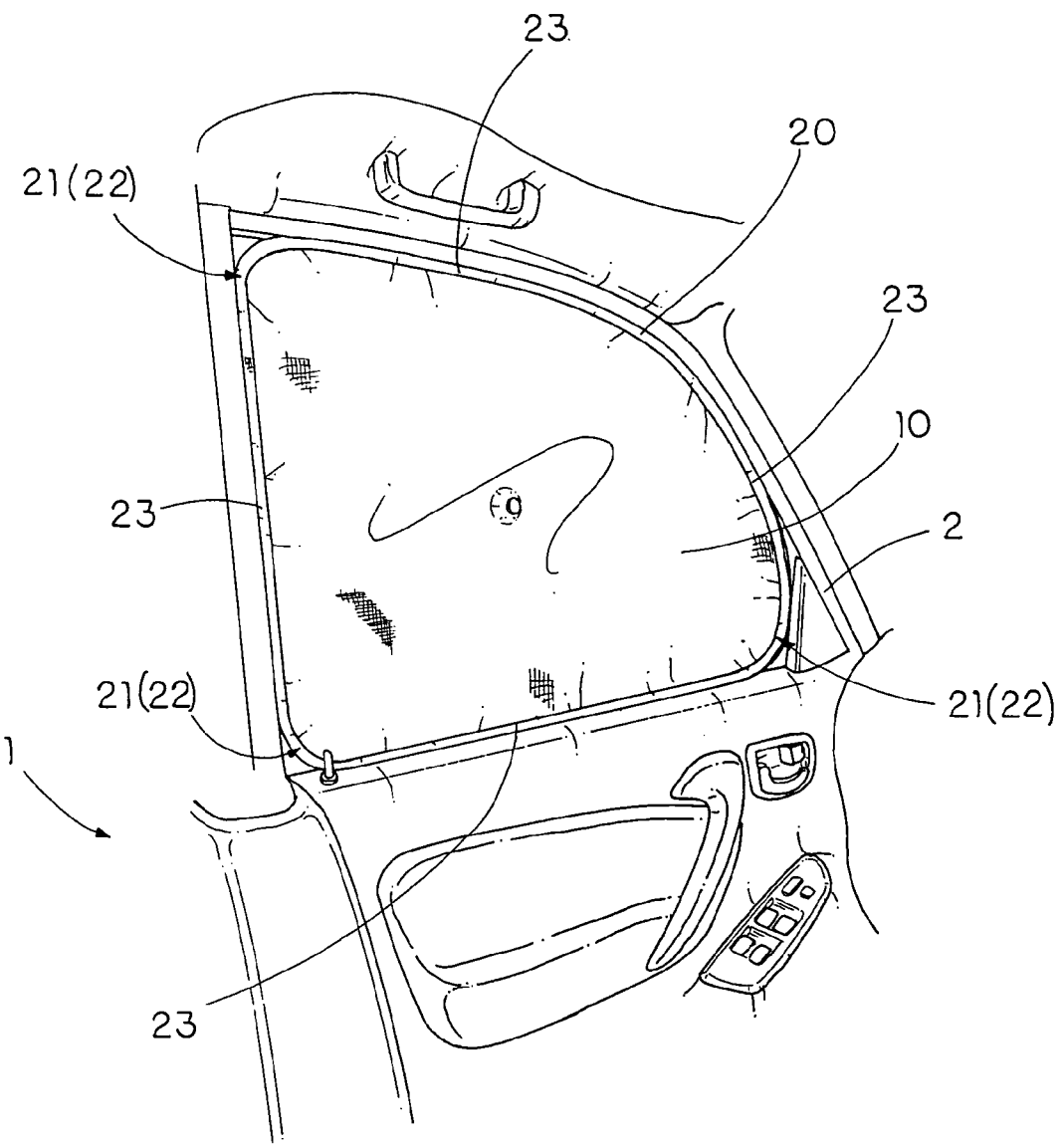
FIG. 1 is a perspective view of a sunshade according to a first preferred embodiment of the present invention, illustrating the sunshade being mounted within the window frame of the vehicle.
Figure 2:
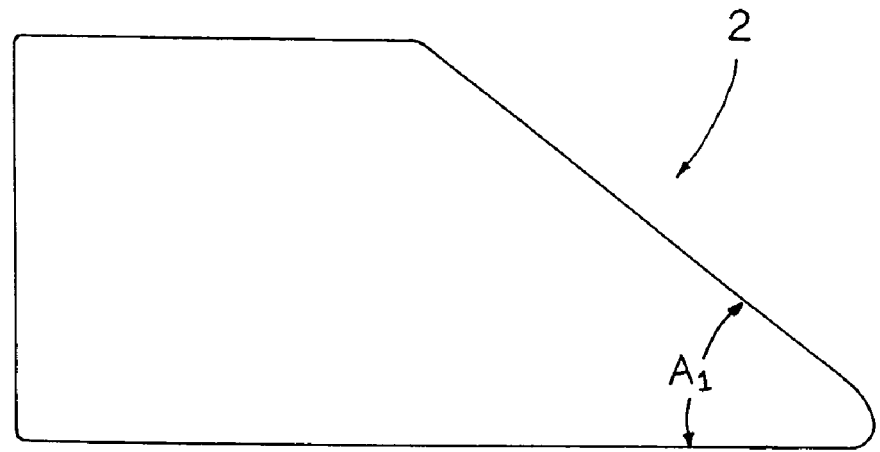
FIG. 2 is a front view of the sunshade according to the above first preferred embodiment of the present invention, illustrating the resilient retention portions of the retention frame being deformed to fit the corners of the window frame.
Figure 2:
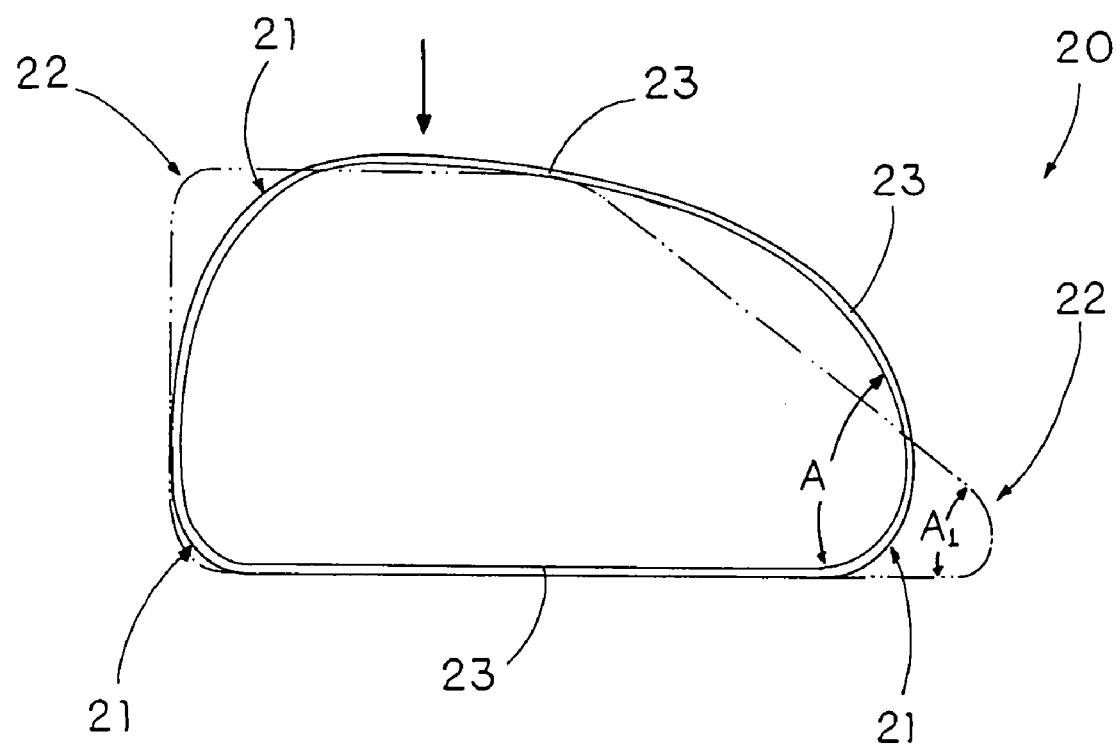
Figure 3:
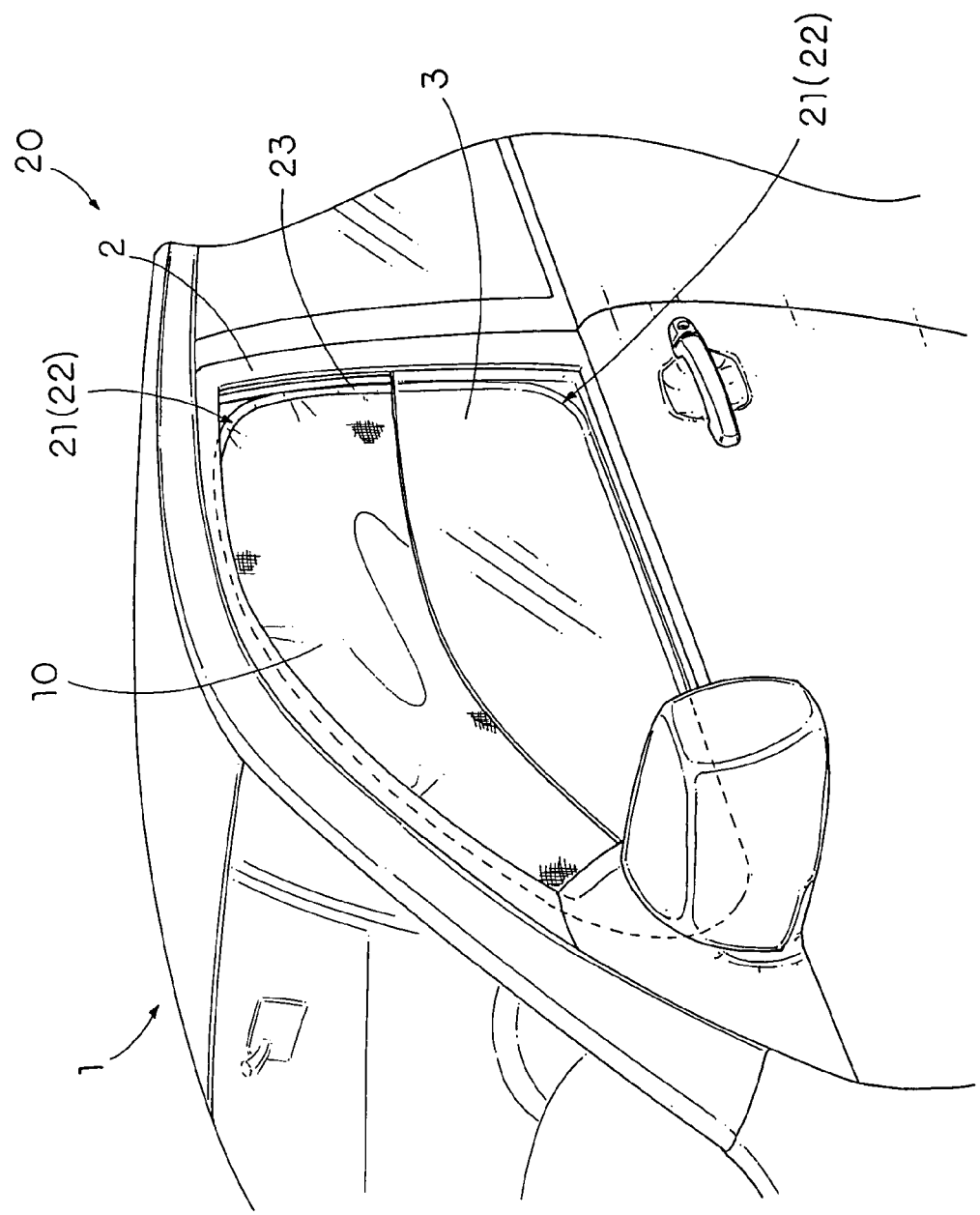
FIG. 3 illustrates the sunshade mounted within the window frame while the side window of the vehicle is operating according to the above first preferred embodiment of the present invention.

Referring to FIGS. 1 to 3 of the drawings, a sunshade according to a preferred embodiment of the present invention is illustrated, wherein the sunshade is adapted for detachably mounting within a window frame 2 of a vehicle 1.

The sunshade comprises a fabric shelter 10, which is sized and shaped adapted for sheltering a side window 3 of the window frame 2, having a heat blocking side 11 for blocking heat radiation of sunlight from entering into the vehicle 1 through the window frame 2, and a retention frame 20 having at least two resilient retention portions 21 spacedly mounted along a peripheral edge of the fabric shelter 10, wherein the resilient retention portions 21 of the retention frame 20 is adapted to be deformed for respectively applying an urging force against corners of the window frame 2 of the vehicle 1 so as to substantially support the fabric shelter 10 within the window frame 2 while the side window 3 thereof is allowed to be normally operated, as shown in FIG. 3.

According to the preferred embodiment, the fabric shelter 10 is made of heat blocking material adapted for substantially blocking the heat radiation of the sunlight to enter into the vehicle 1 when the fabric shelter 10 is enclosed within the window frame 2. The fabric shelter 10 is preferably made of transparent or translucent material that allows a certain amount of sunlight entering into the vehicle 1. Therefore, when the sunshade of the present invention is mounted within the window frame 2, it is safe that the driver can still view the side mirror and be seen from outside through the fabric shelter 10 during driving. Alternatively, the heat blocking side 11 of the fabric shelter 10 has a heat reflective surface to block the heat radiation of the sunlight to enter into the vehicle 1.

Each of the resilient retention portions 21 of the retention frame 20, which is embodied as an elongated resilient element, is bent to shape as a resilient cornering holder 22 having an attachment angle A larger than an interior angle A1 of the corresponding corner of the window frame 2, wherein the resilient cornering holder 22 is adapted to be bent to adjust the attachment angle A thereof for fitting to the corresponding corner of the window frame 2 so as to substantially hold the retention frame 20 within the window frame 2.

As shown in FIG. 2, when each of the resilient cornering holders 22 is bent to deform the attachment angle A to be smaller than the interior angle A1 of the corresponding corner of the window frame 2, the resilient cornering holder 22 is engaged with the corner of the window frame 2. Once the resilient cornering holder 22 rebounds to its original form, the resilient cornering holder 22 applies the urging force against the corner of the window frame 2 so as to securely mount the retention frame 20 within the window frame 2 via the resilient arrangement.

It is worth to mention that the two resilient retention portions 21 of the retention frame 20 are respectively formed the two resilient cornering holders 22 in a diagonal manner such that the two resilient cornering holders 22 are adapted for diagonally mounting to the two corresponding corners of the window frame 2. Furthermore, an additional resilient retention portion 21 is preferred to form a third resilient cornering holder 22 such that the retention frame 20 provides at least three corner alignments for enhancing the attachment between the retention frame 20 and the window frame 2.

Accordingly, the window frame 2, having a quadrilateral shaped has four corners, wherein two diagonal corners respectively have obtuse angles while another two diagonal corners respectively have acute angles. The two resilient cornering holders 22 of the retention frame 20 are respectively mounted at the two diagonal corners having the acute angles. It is because when the interior angle A1 of the corner is an acute angle, the compressed resilient cornering holder 22 can be substantially biased against the corner of the window frame 2 by the physical properties so as to hold the fabric shelter 10 in position.

The retention frame 20 further comprises a plurality of retention arms 23 extended from the resilient retention portions 21 ends to ends to form a loop boundary wherein the loop boundary of the retention frame 20 is substantially attached to the peripheral edge of the fabric shelter 10 so as to retain the fabric shelter 10 within the loop boundary in position.

Accordingly, the retention arms 23 are integrally extended from the resilient retention portions 21 to form the boundary loop such that the retention frame 20, having resilient ability, provides a stretching force on the fabric shelter 10 so as to retain the fabric shelter 10 within the boundary loop in a tension manner. In other words, the retention frame 20 is embodied as an elastic wire bent to form the boundary loop while the fabric shelter 10 is mounted within the retention frame 20.

Figure 4:
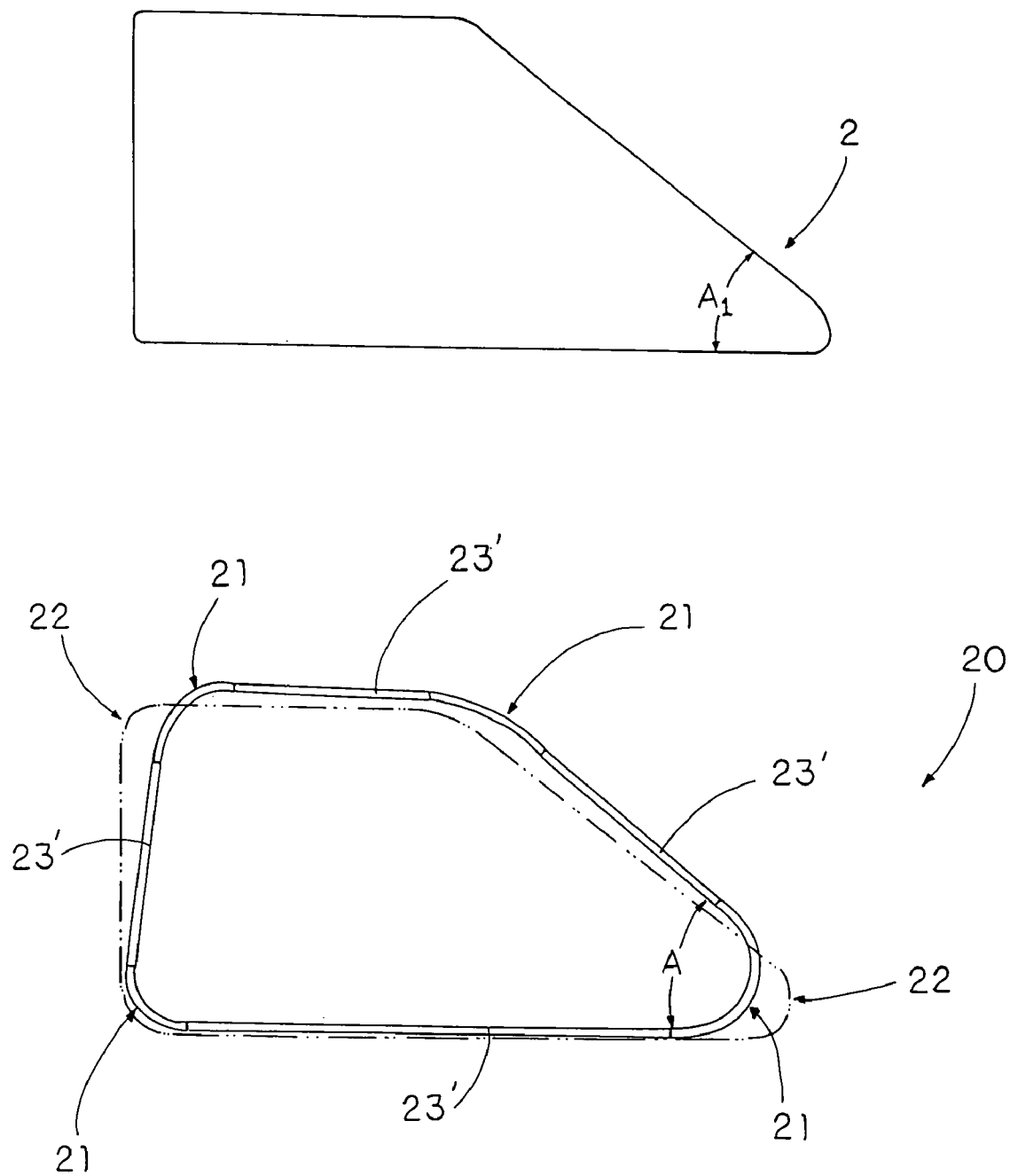
FIG. 4 illustrates an alternative mode of the sunshade according to the above first preferred embodiment of the present invention.

FIG. 4 illustrates an alternative mode of the retention arms 23', wherein the retention arms 23 are coupled with the resilient retention portions 21 to form the boundary loop. Each of the retention arms 23' is embodied as an extension portion extended between the resilient retention portions 21 such that the retention arms 23' reinforces the fabric shelter 10 in position while only the resilient retention portions 21 provide the urging force for biasing against the corners of the window frame 2 respectively. In other words, the retention frame 20 is embodied as a wire bent to form the boundary loop to retain the fabric shelter 10 in position while the wire has a plurality of elastic portions forming as the resilient retention portions 21 respectively.

As shown in FIG. 3, when the sunshade of the present invention is mounted within the window frame 2 of the vehicle 1, the driver is able to operate the side window 3. Therefore, it is an option for the driver, especially during driving, to open the side window 3 for allowing fresh air entering into the vehicle 1 while the sunshade is mounted within the window frame 2 for blocking the sunlight entering into the vehicle at the same time. In other words, the sunshade does not need to contact with the side window 3 in order to mount the sunshade within the window frame 2 such that the side window 3 can be operated normally.

According to the preferred embodiment, the sunshade of the present invention can be custom made for the vehicle 1 that the retention frame 20 and the fabric shelter 10 are shaped and sized corresponding to the window frame 2. In other words, the sunshade can be built with the window frame 2 to form the vehicle window arrangement of the vehicle. Alternatively, the retention frame 20 can be deformed to adjust its shape and size to fit the window frame 2, such that even the size and shape of the window frame 2 is larger or smaller than the sunshade, the retention frame 20 is adjustably deformed to fit the window frame 2 by means of resilient arrangement. Therefore, the sunshade of the present invention is considered as a universal sun shelter for mounting to all kinds of window frame 2 of the vehicle 1.

It is worth to mention that due to the resilient ability of the retention frame 20, the sunshade of the present invention is adapted to be easily folded up by twisting the retention frame 20 to overlap the fabric shelter 10 such that the sunshade is folded into a compact unit for storage. In addition, the mounting operation of the sunshade is easy and fast by simply deforming the resilient retention portions 21 of the retention frame 20 for fitting at corners of the window frame 2 such that the fabric shelter 10 is enclosed within the window frame 2 for blocking the heat radiation of the sunlight from entering into the vehicle 1.

In addition, a glass attaching element, such as suction cup, can be incorporated with the sunshade of the present invention that the glass attaching element is adapted for detachably attaching the fabric shelter 10 on the side window 3 so as to securely mount the sunshade at the window frame 2.

Figure 5:
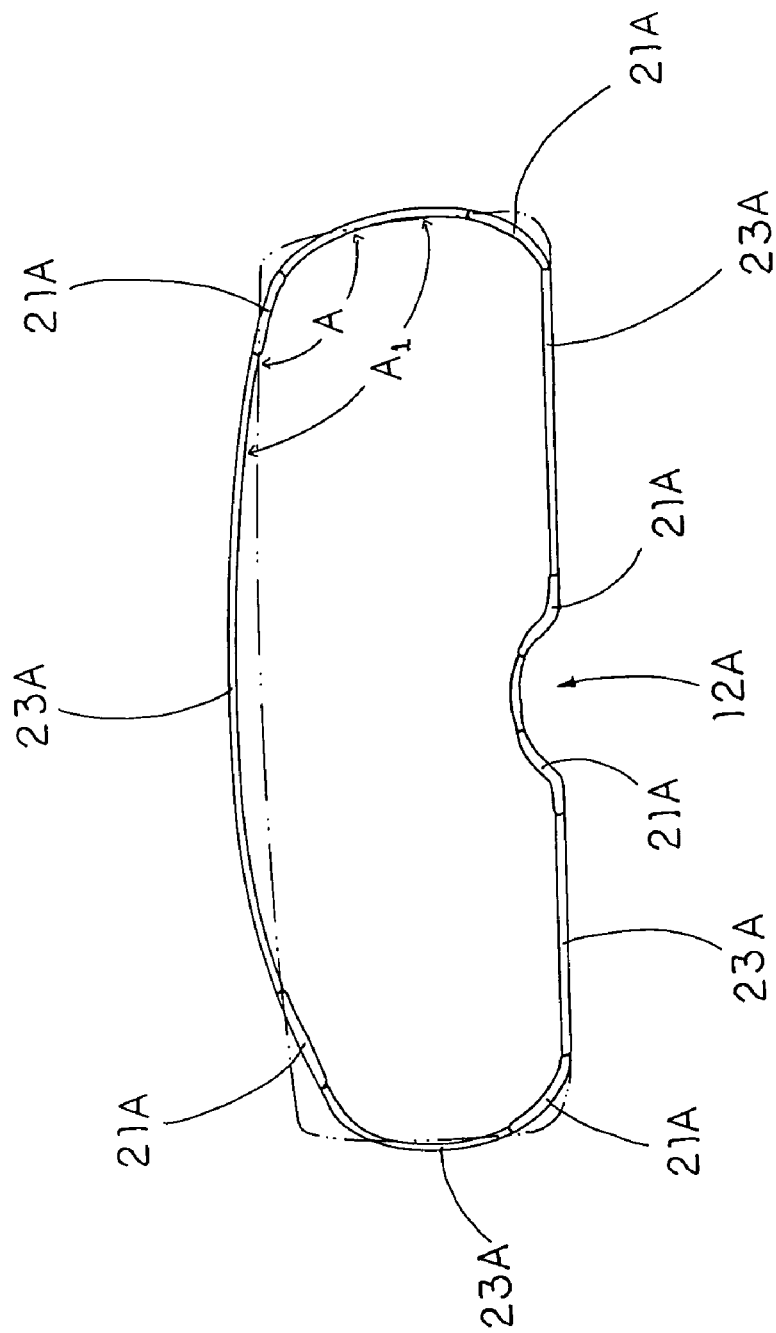
FIG. 5 is a perspective view of a sunshade according to a second preferred embodiment of the present invention.
Figure 6:
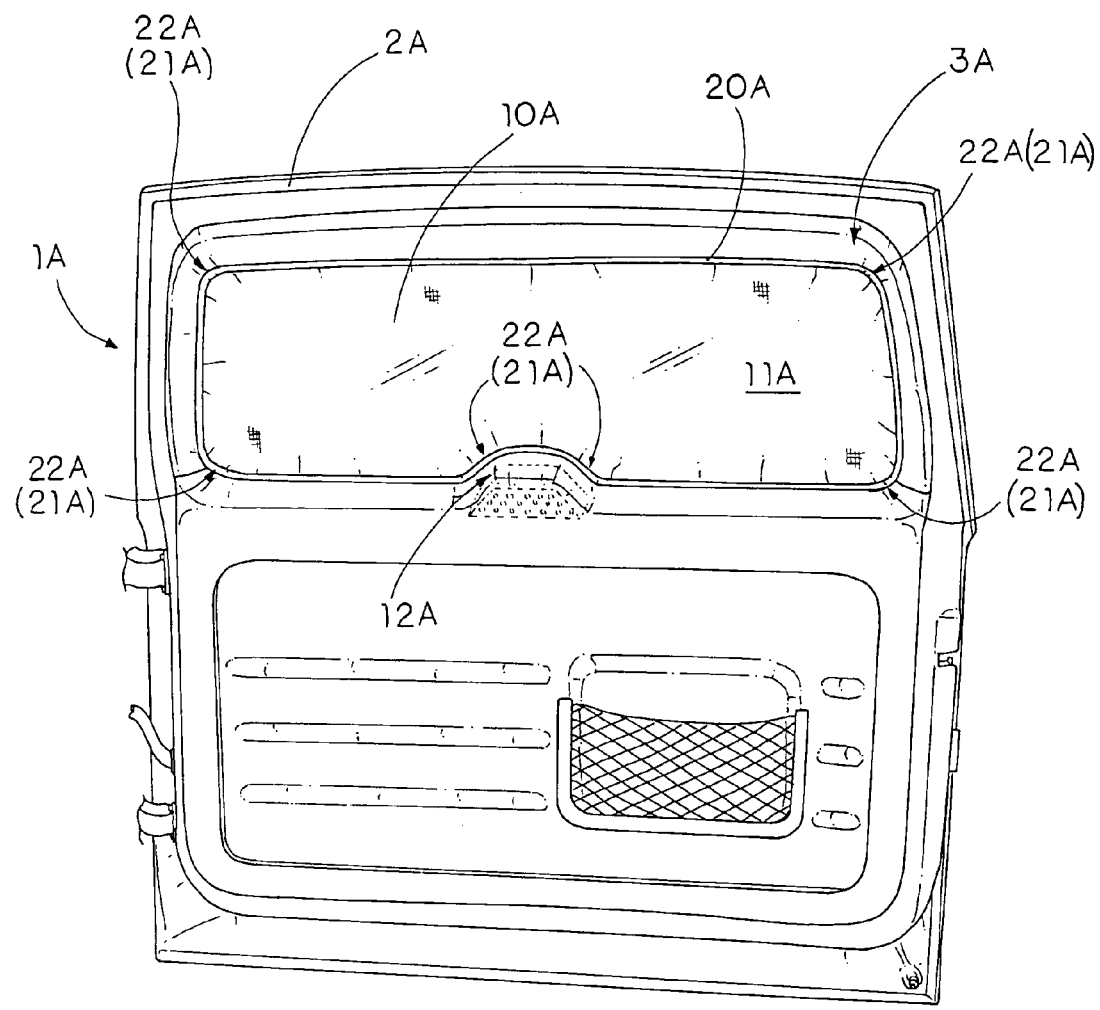
FIG. 6 illustrates the sunshade mounted at a rear window frame of the vehicle according to the above second preferred embodiment of the present invention.
Figure 7:
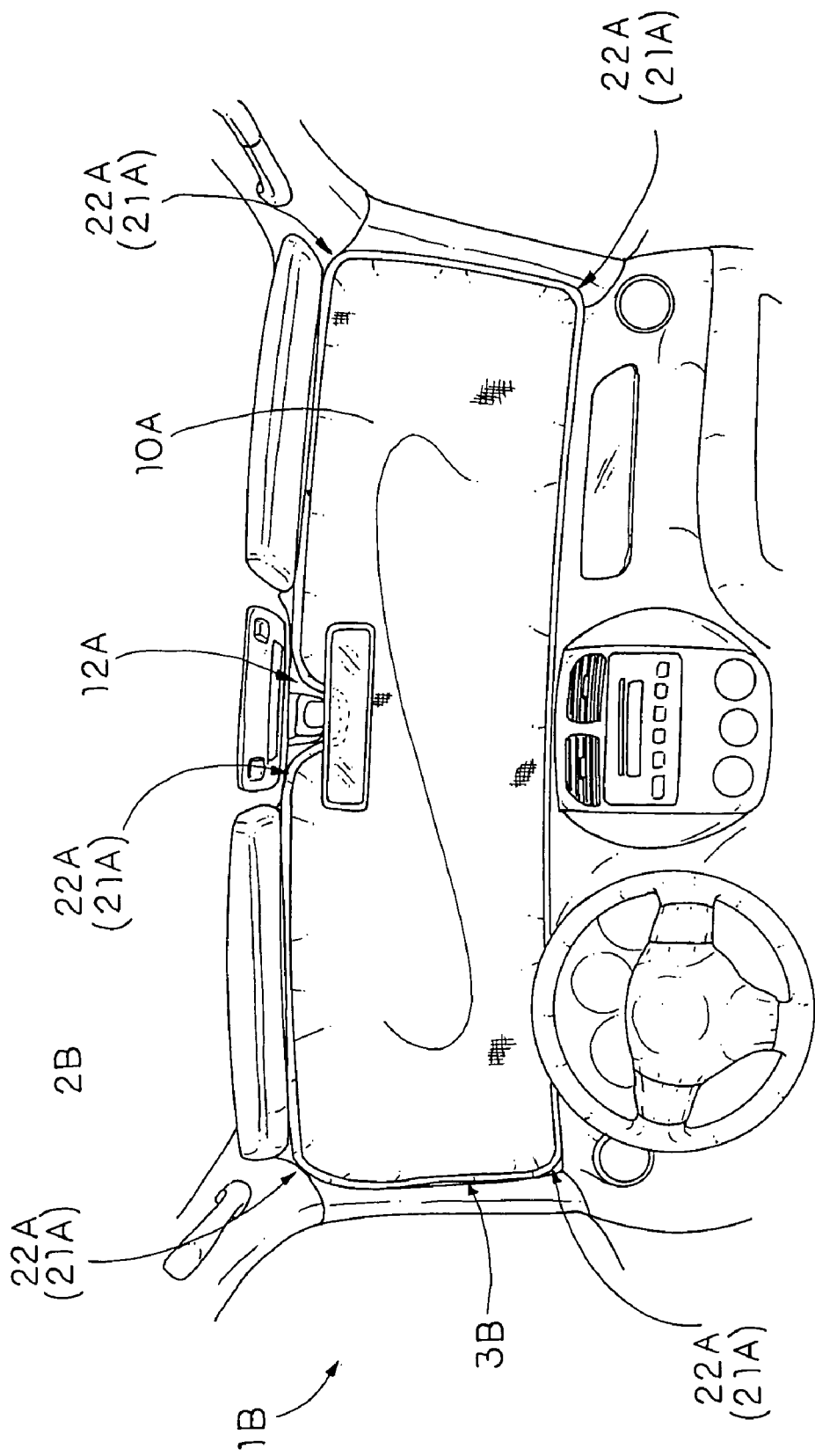
FIG. 7 illustrates the sunshade mounted at a front window frame of the vehicle according to the above second preferred embodiment of the present invention.

As shown in FIGS. 5 through 7, a sunshade of a second embodiment illustrates an alternative mode of the first embodiment of the present invention, wherein the sunshade is adapted for detachably mounting within a front and/or rear window frame 2A of a vehicle 1A.

The sunshade, according to the second embodiment, comprises a fabric shelter 10A, which is sized and shaped adapted for sheltering a front or rear window 3A of the window frame 2A, having a heat blocking side 11A for blocking heat radiation of sunlight from entering into the vehicle 1A through the window frame 2A, and a retention frame 20A having at least two resilient retention portions 21A spacedly mounted along a peripheral edge of the fabric shelter 10A, wherein the resilient retention portions 21A of the retention frame 20A is adapted to be deformed for respectively applying an urging force against corners of the window frame 2A of the vehicle 1A so as to substantially support the fabric shelter 10A within the window frame 2A while the front/rear window 3A thereof is allowed to be normally operated, as shown in FIG. 5.

Each of the resilient retention portions 21A of the retention frame 20A, which is embodied as an elongated resilient element, is bent to shape as a resilient cornering holder 22A having an attachment angle A larger than an interior angle A1 of the corresponding corner of the window frame 2A, wherein the resilient cornering holder 22A is adapted to be bent to adjust the attachment angle A thereof for fitting to the corresponding corner of the window frame 2A so as to substantially hold the retention frame 20A within the window frame 2A.

As shown in FIG. 4, the fabric shelter 10A further has a positioning split 12A formed at a mid-portion of a longitudinal edge of the fabric shelter 10A wherein the retention frame 20A is extended along the positioning split 12A of the fabric shelter 10A to retain the positioning split 12A in shape.

The resilient retention portions 21A of the retention frame 20A are provided at corners of the fabric shelter 10A and the positioning split 12A for respectively applying urging forces against the corners of the window frame 2A and the positioning split 12A of the retention frame 20A so as to selectively adjust a width of the positioning split 12A.

The retention frame 20A further comprises a plurality of retention arms 23A extended from the resilient retention portions 21A ends to ends to form a loop boundary wherein the loop boundary of the retention frame 20A is substantially attached to the peripheral edge of the fabric shelter 10A so as to retain the fabric shelter 10A within the loop boundary in position.

Each of the retention arms 23A is integrally extended between two resilient cornering holders 22A to form a loop boundary which is substantially attached to the peripheral edge of the fabric shelter 10A to retain the fabric shelter 10A in position so as to encircle within the rear window frame 2A of the vehicle 1A. Accordingly, the retention arms 23A can be coupled with the resilient retention portions 21A to form the boundary loop such that only the resilient retention portions 21A provide the urging force for biasing against the corners of the window frame 2A respectively.

As shown in FIG. 6, the sunshade is detachably mounted at the rear window frame 2A of the vehicle 1A wherein the resilient retention portions 21A of the retention frame 20A are biased against the corners of the rear window frame 2A respectively while the rear brake light at a bottom side of the rear window frame 2A fits into the positioning split 12A of the fabric shelter 10A.

Accordingly, when the retention frame 20A is adjustably deformed for fitting the rear window frame 2A, the width of the positioning split 12A is adjusted for biasing against the rear brake light of the vehicle 1A so as to maximize the shading area of the fabric shelter 10A with respect to the rear window 3A of the vehicle 1A. It is worth to mention that the heating wire printed on the rear window can be normally operated when the sunshade is mounted thereto since the sunshade is retained within the rear window frame 2A without directly contacting with the heating wire. In addition, the fabric shelter 10A can be made of transparent or translucent material that allows a certain amount of sunlight entering into the vehicle 1A such that the sunshade can be used for blocking the heat from entering into the vehicle 1A through the rear window 3A during driving.

As shown in FIG. 7, the sunshade according to the second embodiment also fits for detachably mounting at the front window 3B of the vehicle 1B wherein the resilient retention portions 21A of the retention frame 20A are biased against the corners of the front window frame 2B respectively while the rear mirror frame at an upper side of the front window frame 2B fits into the positioning split 12A of the fabric shelter 10A. In other words, when the retention frame 20A is adjustably deformed for fitting the front window frame 2B, the width of the positioning split 12A is adjusted for biasing against the rear mirror frame of the vehicle 1B. It is worth to mention that the fabric shelter 10A is preferably made of transparent material that allows a certain amount of sunlight entering into the vehicle 1A through the front window 3B such that it is safe to use during driving. Otherwise, the sunshade can be used as a sun shelter to block the heat from entering into the vehicle 1A through the front window 3B when the vehicle 1B is parked.

In addition, a glass attaching element, such as suction cup, can be incorporated with the sunshade of the present invention that the glass attaching element is adapted for detachably attaching the fabric shelter 10' on the rear/front window 3A/3B so as to securely mount the sunshade at the rear/front window frame 2A/2B.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A sunshade for detachably mounting at a window frame of a vehicle having first to fourth edges to define first to fourth corners and first to fourth interior angles respectively, comprising:

a fabric shelter which is adapted for sheltering a window of said window frame to block heat radiation of sunlight from entering into said vehicle through said window frame, wherein said fabric shelter is made of material adapted to be seen through from one side of said fabric shelter to another side thereof, and a quadrilateral shaped retention frame comprising four retention arms and first to fourth resilient cornering holders to form a loop boundary having a dimension corresponding to said window frame of said vehicle, wherein a peripheral edge of said fabric shelter is mounted to said retention arms within said loop boundary, wherein a first attachment angle of said first resilient cornering holder is larger than said corresponding first interior angle of said first corner of said window frame, wherein a second attachment angle of said second resilient cornering holder is smaller than said corresponding second interior angle of said second corner of said window frame, wherein a third attachment angle of said first resilient cornering holder, which is diagonally positioned to said first resilient cornering holder, is larger than said corresponding third interior angle of said third corner of said window frame, wherein a fourth attachment angle of said fourth resilient cornering holder, which is diagonally positioned to said second resilient cornering holder, is smaller than said corresponding fourth interior angle of said fourth corner of said window frame, wherein a shape of said retention frame is adapted to be deformed via said first to fourth resilient cornering holders until said first to fourth attachment angles match with said first to fourth interior angles of said window frame respectively;

wherein said retention frame is adapted for detachably mounting to said window frame at a position that said four retention arms are biasing against said first to fourth edges of said window frame respectively not only by an urging force from said resilient cornering holders but also by deformation of said shape of said retention frame, so as to support said fabric shelter within said window frame in a tension manner while said side window thereof is allowed to be normally operated.

2. The sunshade, as recited in claim 1, wherein said retention arms, which are made of non-resilient material, are extended from said resilient cornering holders ends to ends to form said loop boundary, wherein said retention arms retain said fabric shelter in shape while only said resilient cornering holders provide said urging force and allow said shape of said retention frame to be deformed for mounting said retention frame within said window frame.

3. The sunshade, as recited in claim 1, wherein said retention arms, which are made of resilient material, are integrally extended from said resilient cornering holders ends to ends to form said boundary loop such that said retention frame, having resilient ability, not only provides a stretching force on said fabric shelter so as to retain said fabric shelter within said boundary loop in a tension manner but also allows said shape of said retention frame to be deformed for mounting said retention frame within said window frame.

4. The sunshade, as recited in claim 1, wherein said fabric shelter is made of heat blocking material that allows a certain amount of sunlight entering into said vehicle.

5. The sunshade, as recited in claim 2, wherein said fabric shelter is made of heat blocking material that allows a certain amount of sunlight entering into said vehicle.

6. The sunshade, as recited in claim 3, wherein said fabric shelter is made of heat blocking material that allows a certain amount of sunlight entering into said vehicle.

7. The sunshade, as recited in claim 1, wherein said fabric shelter further has a positioning split formed at a mid-portion of a longitudinal edge of said fabric shelter, wherein said retention frame is extended along said positioning split of said fabric shelter while a portion of said retention frame having a resilient ability is provided at said positioning split to selectively adjust a width of said positioning split.

8. The sunshade, as recited in claim 5, wherein said fabric shelter further has a positioning split formed at a mid-portion of a longitudinal edge of said fabric shelter, wherein said retention frame is extended along said positioning split of said fabric shelter while a portion of said retention frame having a resilient ability is provided at said positioning split to selectively adjust a width of said positioning split.

9. The sunshade, as recited in claim 6, wherein said fabric shelter further has a positioning split formed at a mid-portion of a longitudinal edge of said fabric shelter, wherein said retention frame is extended along said positioning split of said fabric shelter while a portion of said retention frame having a resilient ability is provided at said positioning split to selectively adjust a width of said positioning split.

10. A vehicle window arrangement of a vehicle, comprising:

a window frame having first to fourth edges to define first to fourth corners and first to fourth interior angles respectively;

a window supported by said window frame; and a sunshade detachably mounted at said window frame, comprising:

a fabric shelter sheltering said window of said window frame to block heat radiation of sunlight from entering into said vehicle through said window frame, wherein said fabric shelter is made of material adapted to be seen through from one side of said fabric shelter to another side thereof, and a quadrilateral shaped retention frame comprising four retention arms and first to fourth resilient cornering holders to form a loop boundary having a dimension corresponding to said window frame of said vehicle, wherein a peripheral edge of said fabric shelter is mounted to said retention arms within said loop boundary, wherein a first attachment angle of said first resilient cornering holder is larger than said corresponding first interior angle of said first corner of said window frame, wherein a second attachment angle of said second resilient cornering holder is smaller than said corresponding second interior angle of said second corner of said window frame, wherein a third attachment angle of said first resilient cornering holder, which is diagonally positioned to said first resilient cornering holder, is larger than said corresponding third interior angle of said third corner of said window frame, wherein a fourth attachment angle of said fourth resilient cornering holder, which is diagonally positioned to said second resilient cornering holder, is smaller than said corresponding fourth interior angle of said fourth corner of said window frame, wherein a shape of said retention frame is adapted to be deformed via said first to fourth resilient cornering holders until said first to fourth attachment angles match with said first to fourth interior angles of said window frame respectively;

wherein said retention frame is adapted for detachably mounting to said window frame at a position that said four retention arms are biasing against said first to fourth edges of said window frame respectively not only by an urging force from said resilient cornering holders but also by deformation of said shape of said retention frame, so as to support said fabric shelter within said window frame in a tension manner while said side window thereof is allowed to be normally operated.

11. The vehicle window arrangement, as recited in claim 10, wherein said retention arms, which are made of non-resilient material, are extended from said resilient cornering holders ends to ends to form said loop boundary, wherein said retention arms retain said fabric shelter in shape while only said resilient cornering holders provide said urging force and allow said shape of said retention frame to be deformed for mounting said retention frame within said window frame.

12. The vehicle window arrangement, as recited in claim 10, wherein said retention arms, which are made of resilient material, are integrally extended from said resilient cornering holders ends to ends to form said boundary loop such that said retention frame, having resilient ability, not only provides a stretching force on said fabric shelter so as to retain said fabric shelter within said boundary loop in a tension manner but also allows said shape of said retention frame to be deformed for mounting said retention frame within said window frame.

13. The vehicle window arrangement, as recited in claim 10, wherein said fabric shelter is made of heat blocking material that allows a certain amount of sunlight entering into said vehicle.

14. The vehicle window arrangement, as recited in claim 11, wherein said fabric shelter is made of heat blocking material that allows a certain amount of sunlight entering into said vehicle.

15. The vehicle window arrangement, as recited in claim 12, wherein said fabric shelter is made of heat blocking material that allows a certain amount of sunlight entering into said vehicle.

16. The vehicle window arrangement, as recited in claim 10, wherein said fabric shelter further has a positioning split formed at a mid-portion of a longitudinal edge of said fabric shelter, wherein said retention frame is extended along said positioning split of said fabric shelter while a portion of said retention frame having a resilient ability is provided at said positioning split to selectively adjust a width of said positioning split.

17. The vehicle window arrangement, as recited in claim 14, wherein said fabric shelter further has a positioning split formed at a mid-portion of a longitudinal edge of said fabric shelter, wherein said retention frame is extended along said positioning split of said fabric shelter while a portion of said retention frame having a resilient ability is provided at said positioning split to selectively adjust a width of said positioning split.

18. The vehicle window arrangement, as recited in claim 15, wherein said fabric shelter further has a positioning split formed at a mid-portion of a longitudinal edge of said fabric shelter, wherein said retention frame is extended along said positioning split of said fabric shelter while a portion of said retention frame having a resilient ability is provided at said positioning split to selectively adjust a width of said positioning split.

* * * * *